Oct. 9, 1962      F. BILANIN      3,057,115

SAP COLLECTING APPARATUS AND VENTING MEANS THEREFOR

Filed March 23, 1959

INVENTOR
FRANK BILANIN

BY
Carpenter, Abbott, Coulter & Kinney
ATTORNEYS

United States Patent Office 3,057,115
Patented Oct. 9, 1962

3,057,115
SAP COLLECTING APPARATUS AND VENTING MEANS THEREFOR
Frank Bilanin, White Bear Lake, Minn., assignor to Minnesota Mining and Manufacturing Company, St. Paul, Minn., a corporation of Delaware
Filed Mar. 23, 1959, Ser. No. 801,185
1 Claim. (Cl. 47—52)

This invention relates to improvements in sap collecting apparatus and venting means therefor.

Recent developments in the art of collecting maple sap or the like have been in the direction of closed systems in which sap is conducted from the spiles through a conduit network, for example of plastic tubing, to a reservoir. In systems of this type it is preferred, where the topography permits, to employ a layout which takes advantage of the force of gravity to the greatest extent possible in promoting sap flow through the network to the reservoir. In addition the closed type of system permits advantage to be taken of the hydraulic pressure developed by the trees in promoting sap flow through the network.

The hydraulic pressure under which sap is delivered by the trees to the spiles may vary from zero to thirty lbs. per square inch, the average peak pressure usually being in the range of fifteen to twenty p.s.i. In contrast to the periods of peak pressure there are substantial periods of what is known as "bleeding flow" during which the sap pressure is very low, i.e. in the range of from 1 to 3 p.s.i. Experience has shown that during these periods, even though a positive pressure head is developed by the trees, this pressure is not sufficient to overcome the impedance to flow presented by the closed system. As a result, during such periods of low pressure most of the sap available at the spiles passes on up the trees and is lost so far as collection thereof is concerned.

I have discovered that sap flow into the collecting network during periods of low sap pressure can be effected by venting the closed system at one or more elevated locations therein. Venting of the system permits the low pressure sap to flow freely, by gravity and under atmospheric pressure, to the reservoir, with the result that substantially increased amounts of sap are collected.

As desirable as venting of a closed system during periods of low sap pressure has been found to be, such venting is undesirable during periods of higher or peak sap pressure, since it is preferred to utilize such higher pressures, when available, to pressurize the system and thereby accelerate the flow of sap therethrough. Venting of the system during periods of higher sap pressure and flow would permit escape and thereby the loss of sap through the venting means. A similar situation would occur upon resumption of sap flow following a freeze-up causing the lines to be blocked by frozen sap. In the latter case the impedance to sap flow presented by the frozen sap would force the sap to escape through the venting means. Venting of the lines of a sap collection system as aforedescribed also presents problems in connection with the entry of insects and other contaminants as well as bacteria laden air into the system through the venting means. Maple sap, being a food product, is susceptible to bacterial action which tends to cause discoloration. Discoloration or contamination lowers the quality of the sap and, in turn, substantially lowers the price commanded by the products made therefrom.

In the light of the foregoing remarks, the present invention has for its principal object the provision of an improved sap collecting apparatus of the type wherein a network of tubing is utilized to conduct sap from a plurality of spiles to a reservoir, the apparatus being provided with venting means operable during periods of low sap pressure to vent the system to the atmosphere and operable during periods of higher sap pressure to permit pressurization of the system while preventing escape of sap through said venting means.

Another object of the invention is to provide a novel vent valve assembly for use in a sap collecting apparatus of the aforementioned character, said vent valve means being provided with filter means in the path of venting air into the system for preventing entry of contaminants into the system through the venting means.

A more specific object of the invention is to provide a vent valve assembly of the class described in which the filter means is impregnated with a bactericide effective to kill bacteria entering the system with the venting air.

Another object of the invention is to provide an improved sap collecting apparatus and venting means therefor as aforedescribed affording collection of a substantially increased percentage of the sap available at the spiles and yielding a high quality product free from contamination and bacterial action.

Other objects and advantages of the invention will become apparent as the description proceeds, reference being had to the drawing accompanying and forming a part of this specification wherein.

Figure 2:
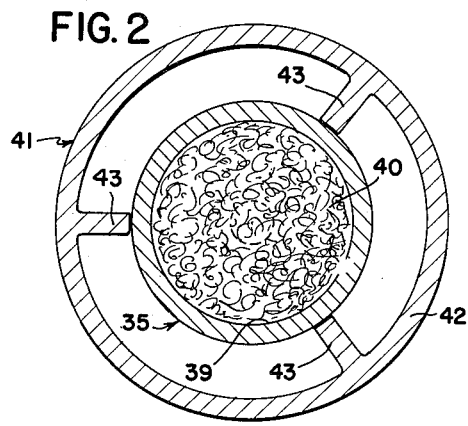
FIGURE 2 is a sectional plan view taken along the line II—II of FIGURE 1.
Figure 1:
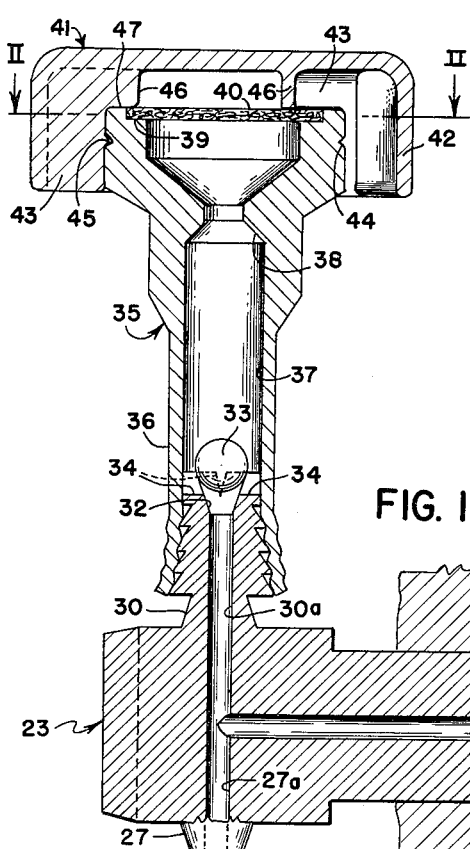
FIGURE 1 is a semi-diagrammatic view of the improved sap collecting apparatus, the venting means of which and portions of the parts thereadjacent being shown on an enlarged scale and in vertical section.

Referring now to FIGURE 1, in which portions of the improved sap collecting apparatus are shown diagrammatically, maple trees 6, 7, 8, 9 and 10 located at various elevations are tapped by means of tubular spiles 11, 12, 13, 14 and 15 which are connected by tributary conduits, for example flexible plastic tubing, to a main or trunk conduit 21 for conduction of maple sap from the spiles to a reservoir 22. The apparatus is preferably laid out in a manner to take advantage of the topography such that the sap can flow by gravity from the tributary lines to the trunk line 21 and through the latter to the reservoir 22. The tributary conduits are connected to the spiles and to the trunk line 21 in a manner to form a closed system or network indicated generally by the numeral 5.

In order to insure sap flow through the apparatus to the reservoir during periods of low sap pressure, I provide venting means at an elevated location, preferably at the highest point in the system 5. The improved venting means comprises a spile shown fragmentarily at 23 having a tubular segment 24 inserted in the bore 25 of a tree shown fragmentarily at 26. The spile 23 is provided with a tapered tubular connector 27 projecting therefrom and formed with external annular ribs adapted to dig into the inner surface of and hold one end of a flexible plastic tributary conduit 28 telescoped thereover. The other end of the conduit 28 is connected to the trunk line 21 as shown diagrammatically. The tubular connector 27 is shown as depending from the spile 23, but this is only for convenience of disclosure. The spile 23 is formed with a bore 27a extending coaxially within the connector 27 and communicating with the bore 24a of the tubular segment 24 for conduction of sap from the tree bore 25 into the tubing network and thence to the reservoir 22.

The spile 23 is also provided with an upstanding tapered tubular connector 30 similar to the connector 27 in external configuration. The spile 23 is formed with a bore 30a extending axially of the connector 30 and affording communication with the bores 24a and 27a as shown. The upper end of the connector 30 is formed with a frusto-conical counterbore 32 adapted to afford a lower seat for a spherical floating type check valve member 33 which preferably is solid and made of material having a specific gravity of less than one, for example polyethylene. The valve member 33 may be made of heavier material and when so made is preferably hollow to afford buoyancy at least equivalent to that of a solid valve member of the same size made of polyethylene. The upper end of the connector 30 is also provided with a plurality of openings 34 through which venting air can flow into the bore 30a while the valve member 33 is disposed on the seat 32 as shown. The openings 34 may conveniently take the form of V-shaped notches, for example four in number, extending inwardly from the terminal end of the connector 30 as shown.

Mounted on the tubular connector 30, for example by having its lower end telescoped thereon as shown, is a tubular vent fitting 35 which may be formed of resilient plastic material and has a lower end portion 36 having an inner diameter end wall thickness of a size to afford a snug fit on the connector 30 by manual application of the portion 36 to said connector. The portion 36 is also preferably transparent or translucent to permit observation of the interior thereof. The fitting 35 is provided with a thick walled upper end portion which is generally funnel-shaped. The bore of the fitting 35 is irregular in shape, there being a cylindrical bore portion 37 terminating at its upper end in a frusto-conical upper valve seat 38 with which the valve member 33 is cooperable as will hereinafter appear.

The upper end of the fitting 35 is formed with a counterbore 39 adapted to receive a removable air permeable filter disc 40 which is preferably made of a porous absorbent material such as absorbent cotton or loosely matted felt material which has been impregnated with a suitable bactericide, for example a five percent solution of sodium hypochlorite.

Removably mounted on the upper end of the fitting 35 and forming a chamber therewith is a cup-shaped, cap or cover 41 which may also be made of flexible plastic material. The cap 41 is provided with a depending annular flange 42 and with a plurality of equally spaced radially inwardly projecting lugs 43 which are preferably identical in shape. The upper end of the fitting 35 is formed with a circumferential groove 44, and lugs 43 are formed with rounded projections 45 which snugly engage the groove 44 when the cap 41 is in place on the fitting 35 as shown. The lugs 43 are also formed with radially inwardly offset portions 46 each providing a shoulder 47 engaging the upper end surface of the fitting 35 and also overlapping the filter disc 40. The offset portions 46 serve the dual purpose of preventing the cap 41 from being pressed downwardly too far onto the fitting 35, as well as of retaining the filter disc 40 in the operative position shown.

It will be observed that the lugs 43 provide for mounting of the cup-shaped main body portion of the cap 41 in spaced relation with respect to the upper end of the fitting 35 and provide for venting of the bore of the fitting 35 to the ambient atmosphere through a passage which is protected from the elements and includes the filter disc 40 in the path of all venting air. The filter 40 prevents the entry of insects and other contaminants, and the bactericide impregnated therein tends to destroy any bacteria carried therethrough in venting air.

In the operation of the improved sap collecting apparatus, during periods of low sap pressure, the ball check valve member 33 is disposed as shown in FIGURE 1 and the sap collecting network 5 is vented to the atmosphere through spile bores 27a and 30a, openings 34, tubular fitting 35 and filter disc 40. Upon the onset of increased sap pressures and correspondingly increased rate of flow of the sap to a level above that which can be accommodated by the sap collecting system 5 at atmospheric pressures, the sap rises in the bore 30a and enters the bore 37 of the fitting 35, tending to escape from the sap collecting system through the upper end of the fitting 35. As the sap rises in the bore 37, however, the ball check valve member 33 floats on the surface of said sap and is brought into sealing engagement with the frusto-conical upper seat 38.

With the valve member 33 seated on the seat 38 sap is prevented from escaping from the network 5 through the fitting 35 and a closed system is made of said network. The increased sap pressure pressurizes the closed network and accelerates the flow of sap therethrough to the reservoir 22. The valve member 33 is held in closed position against the seat 38 as long as the sap pressure maintains the level of the sap at the upper end of the bore 37 of fitting 35. As the sap pressure thereafter subsides, the level of the sap within the bore 37 gradually recedes, and withdraws the valve member 33 from seat 38 to again vent the sap collecting network to atmospheric pressure.

Figure 3:
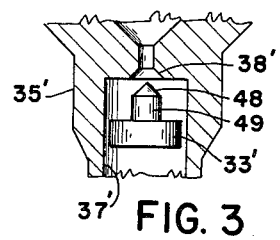
FIGURE 3 is a fragmental vertical section view of another form of the improved venting means.
Figure 4:
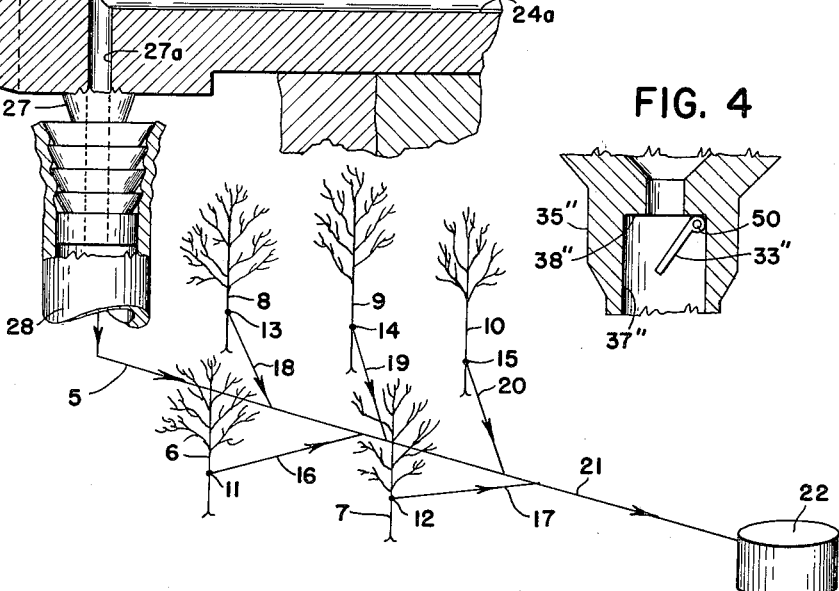
FIGURE 4 is a fragmental vertical sectional view of still another form of the improved venting means.

FIGURES 3 and 4 illustrate other forms of the invention in which the primed or double-primed reference characters indicate parts corresponding to those in FIGURE 1 bearing the same reference characters unprimed. In FIGURE 3 a check valve member 33' of generally cylindrical shape is shown provided with a coaxial upstanding cylindrical projection 49 having a conical end face 48. The fitting 35' is formed with a frusto-conical valve seat 38', and the check valve member 33' is moved toward and away from sealing engagement of the face 48 with the seat 38' in a manner similar to the movement of the ball valve member 33 in FIGURE 1. The check valve member 33' is preferably made of the same material as the ball valve member 33 and therefore floats on the sap in the same manner as valve member 33.

FIGURE 4 illustrates another form of the invention in which the check valve member 33" takes the form of a flap type valve pivotally mounted as at 50. The valve 33" is swingable toward and away from sealing engagement with a flat annular seat 38" and is preferably made of the same material as the ball valve 33 of FIGURE 1 for flotation on the sap within the bore 37".

The operation of the structures shown in FIGURES 3 and 4 has the same effect on the improved sap collecting system as does the corresponding structure in FIGURE 1. As the sap rises within the bores 37' or 37", the valve members 33' or 33" are moved thereby into seating engagement with the seats 38' or 38" to prevent the escape of sap from the fittings 35' or 35" and pressurize the sap collecting network. When the sap pressure subsides and the sap level recedes within the bores 37' or 37", the valve members 33' or 33" are retracted from their respective upper seats to afford venting of the sap collecting network.

The specific forms of the invention illustrated having been selected to facilitate disclosure of the invention and are not intended to limit the number of forms which the invention can take or to confine the invention to a particular use. Various alterations, adaptations and modifications may be made without departing from the spirit of the invention, and all of such alterations, adaptations and modifications are contemplated as may come within the scope of the appended claim.

What is claimed as the invention is:

Apparatus for collecting sap from a maple tree capable of exerting hydraulic pressure to cause its sap to flow therefrom, comprising a spile having a tubular segment for establishing a fluid-tight sap tapping connection within a tape hole of a tree to enable sap to flow thereinto, said spile also having a downwardly directed tubular outlet and having a generally coaxial vertically upwardly arranged tubular vent, the bores of said tubular segment, outlet and vent being in continuous communication, tubing having fluid-tight connection with said outlet and disposed to provide with said spile a system for normally conducting sap by gravity from a tapped tree to a remotely located collection point, said tubular vent having a normally open upper end providing free venting of said system to the atmosphere, and means for subjecting said system to the hydraulic pressure of sap entering said spile to thereby increase the rate of sap flow through said system to said collection point when the rate of sap flow into said system from a tapped tree exceeds the rate at which sap can flow by gravity through said system, said means comprising a valve seat in said tubular vent, and a check valve member in said tubular vent cooperable with said seat and having a normal lowered open position spaced below said seat, said valve member being movable by sap tending to escape from said system through said vent to a raised closed position in which it closes said vent.

References Cited in the file of this patent

UNITED STATES PATENTS

| | | |
|---|---|---|
| 631,604 | Aller | Aug. 22, 1899 |
| 858,380 | Gilmer | July 2, 1907 |
| 1,221,509 | Chesley | Apr. 3, 1917 |
| 2,725,071 | McKillop | Nov. 29, 1955 |
| 2,800,134 | Merritt | July 23, 1957 |
| 2,819,799 | Wilkerson | Jan. 14, 1958 |
| 2,877,601 | Griggs | Mar. 17, 1959 |

FOREIGN PATENTS

| | | |
|---|---|---|
| 100,342 | Australia | Mar. 4, 1937 |